United States Patent [19]
Coyle

[11] Patent Number: 5,764,029
[45] Date of Patent: Jun. 9, 1998

[54] PORTABLE RECHARGEABLE BATTERY ADAPTOR ASSEMBLY

[76] Inventor: Tim Coyle, 835 Maplewood, Reno, Nev. 89505

[21] Appl. No.: 775,251

[22] Filed: Dec. 30, 1996

[51] Int. Cl.$^6$ .................................................. H01M 10/46
[52] U.S. Cl. .......................................... 320/112; 320/114
[58] Field of Search ............................... 320/2, 5, 112, 320/113, 114, 115, 118, 107, 101, 104; D13/103, 107, 108; 429/96, 97, 100

[56] References Cited

U.S. PATENT DOCUMENTS

| D. 345,727 | 4/1994 | Flower et al. | D13/103 |
|---|---|---|---|
| D. 354,729 | 1/1995 | Poon | D13/106 |
| 4,829,226 | 5/1989 | Nakamura et al. | 320/2 X |
| 5,122,427 | 6/1992 | Flowers et al. | 429/97 |
| 5,216,371 | 6/1993 | Nagai | 429/90 X |
| 5,225,760 | 7/1993 | Leiserson | 320/2 |
| 5,607,794 | 3/1997 | Koenig | 429/100 |

*Primary Examiner*—Edward Tso

[57] ABSTRACT

A portable rechargeable battery adapter assembly has a battery holder having a positive and a negative battery contact. A battery compartment connector has a positive and a negative compartment contact for placement within the battery compartment of an electronic device. The positive and negative compartment contacts are positioned to align with the positive and negative receiving stations within the electronic device's battery compartment. Transmission wires connects the positive battery contact with the positive compartment contact and the negative battery contact with the negative compartment contact. In a preferred embodiment, the battery compartment connector is spring loaded to engage the compartment connector within the battery compartment of the electronic device.

14 Claims, 3 Drawing Sheets

PORTABLE RECHARGEABLE BATTERY ADAPTOR ASSEMBLY

BACKGROUND OF THE INVENTION

1. Field of the Invention

The present invention relates to rechargeable battery packs and more particularly pertains to a new Portable Rechargeable Battery Adapter Assembly for offering an easily adaptable alternate power supply for common appliances.

2. Description of the Prior Art

The use of rechargeable battery packs is known in the prior art. More specifically, rechargeable battery packs heretofore devised and utilized are known to consist basically of familiar, expected and obvious structural configurations, notwithstanding the myriad of designs encompassed by the crowded prior art which have been developed for the fulfillment of countless objectives and requirements.

Known prior art rechargeable battery packs include U.S. Pat. No. 4,829,226; U.S. Pat. No. 5,225,760; U.S. Pat. No. D345,727; U.S. Pat. No. D354,729; U.S. Pat. No. 5,216,371; and U.S. Pat. No. 5,122,427.

While these devices fulfill their respective, particular objectives and requirements, the aforementioned patents do not disclose a new Portable Rechargeable Battery Adapter Assembly. The inventive device includes a battery receptacle comprising a battery holder and a battery receptacle terminal, a transmission wire, and a battery compartment connector.

In these respects, the Portable Rechargeable Battery Adapter Assembly according to the present invention substantially departs from the conventional concepts and designs of the prior art, and in so doing provides an apparatus primarily developed for the purpose of offering an easily adaptable alternate power supply for common appliances.

SUMMARY OF THE INVENTION

In view of the foregoing disadvantages inherent in the known types of rechargeable battery packs now present in the prior art, the present invention provides a new Portable Rechargeable Battery Adaptor Assembly construction wherein the same can be utilized for offering an easily adaptable alternate power supply for common appliances.

The general purpose of the present invention, which will be described subsequently in greater detail, is to provide a new Portable Rechargeable Battery Adaptor Assembly apparatus and method which has many of the advantages of the rechargeable battery packs mentioned heretofore and many novel features that result in a new Portable Rechargeable Battery Adaptor Assembly which is not anticipated, rendered obvious, suggested, or even implied by any of the prior art rechargeable battery packs, either alone or in any combination thereof.

To attain this, the present invention generally comprises a battery receptacle comprising a battery holder and a battery receptacle terminal, a transmission wire, and a battery compartment connector.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Portable Rechargeable Battery Adaptor Assembly apparatus and method which has many of the advantages of the rechargeable battery packs mentioned heretofore and many novel features that result in a new Portable Rechargeable Battery Adaptor Assembly which is not anticipated, rendered obvious, suggested, or even implied by any of the prior art rechargeable battery packs, either alone or in any combination thereof.

It is another object of the present invention to provide a new Portable Rechargeable Battery Adaptor Assembly which may be easily and efficiently manufactured and marketed.

It is a further object of the present invention to provide a new Portable Rechargeable Battery Adaptor Assembly which is of a durable and reliable construction.

An even further object of the present invention is to provide a new Portable Rechargeable Battery Adaptor Assembly which is susceptible of a low cost of manufacture with regard to both materials and labor, and which accordingly is then susceptible of low prices of sale to the consuming public, thereby making such Portable Rechargeable Battery Adaptor Assembly economically available to the buying public.

Still yet another object of the present invention is to provide a new Portable Rechargeable Battery Adaptor Assembly which provides in the apparatuses and methods of the prior art some of the advantages thereof, while simultaneously overcoming some of the disadvantages normally associated therewith.

Still another object of the present invention is to provide a new Portable Rechargeable Battery Adaptor Assembly for offering an easily adaptable alternate power supply for common appliances.

Yet another object of the present invention is to provide a new Portable Rechargeable Battery Adaptor Assembly which includes a battery receptacle comprising a battery holder and a battery receptacle terminal, a transmission wire, and a battery compartment connector.

Still yet another object of the present invention is to provide a new Portable Rechargeable Battery Adaptor Assembly that expands the use of existing rechargeable power sources.

Even still another object of the present invention is to provide a new Portable Rechargeable Battery Adaptor Assembly that saves a consumer money by not having to replace batteries and by accommodating the use of rechargeable batteries that last longer.

Even still another object of the present invention is to provide a new Portable Rechargeable Battery Adaptor Assembly that provides the convenience of having one power supply for several appliances.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
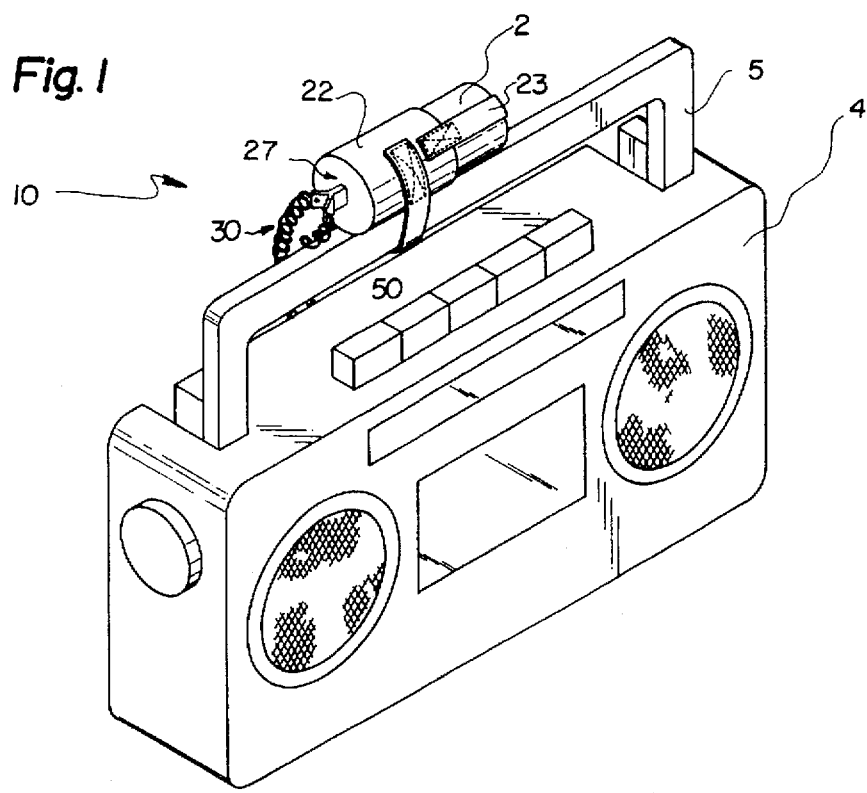
FIG. 1 is an in-use illustration of a new Portable Rechargeable Battery Adaptor Assembly according to the present invention.

With reference now to the drawings, and in particular to FIGS. 1 through 6 thereof, a new Portable Rechargeable Battery Adaptor Assembly embodying the principles and concepts of the present invention and generally designated by the reference numeral 10 will be described.

More specifically, it will be noted that the Portable Rechargeable Battery Adaptor Assembly 10 comprises a battery receptacle 20 comprising a battery holder 21 and a battery receptacle terminal 27, a transmission wire 30, and a battery compartment connector 40. The Portable Rechargeable Battery Adaptor Assembly 10 provides a means for adapting a rechargeable battery 2 for use in an electrical device 4 having a battery compartment 6 including a positive battery terminal 7 and a negative battery terminal 8. The rechargeable battery 2 is preferably a standard rechargeable battery, more preferably the kind commonly used with cordless power tools, since they normally have the highest capacity, although other standard rechargeable batteries can be used. For example, a 7 volt Radio Shack rechargeable battery (catalogue number 23-230), a 9 volt Radio Shack rechargeable battery (catalogue number 23-229), or similar battery can be used to great advantage in the practice of this invention. A voltage regulator may be used to adapt a rechargeable battery of a given voltage for use with a device requiring a different voltage. Whichever kind of rechargeable battery is used, the Portable Rechargeable Battery Adaptor Assembly 10 is adapted to hold the rechargeable battery 2 securely.

Figure 2:
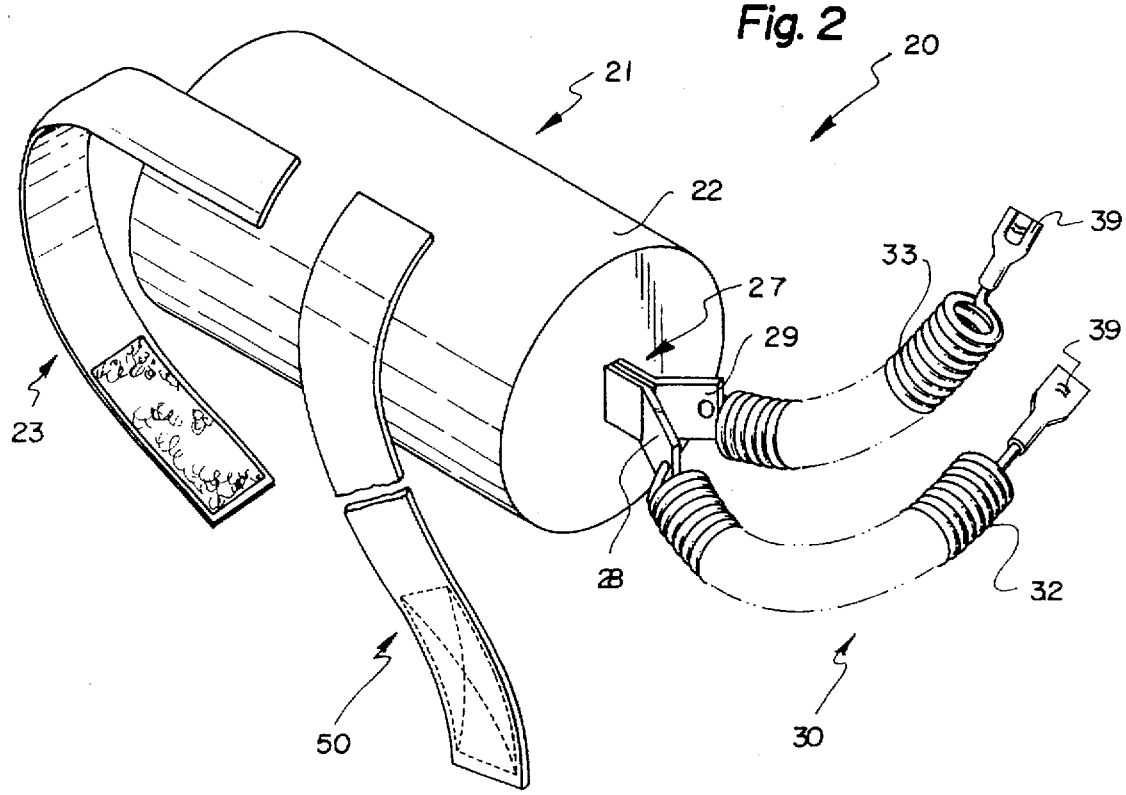
FIG. 2 is an isometric illustration of the battery receptacle and the transmission wire according to the present invention.
Figure 3:
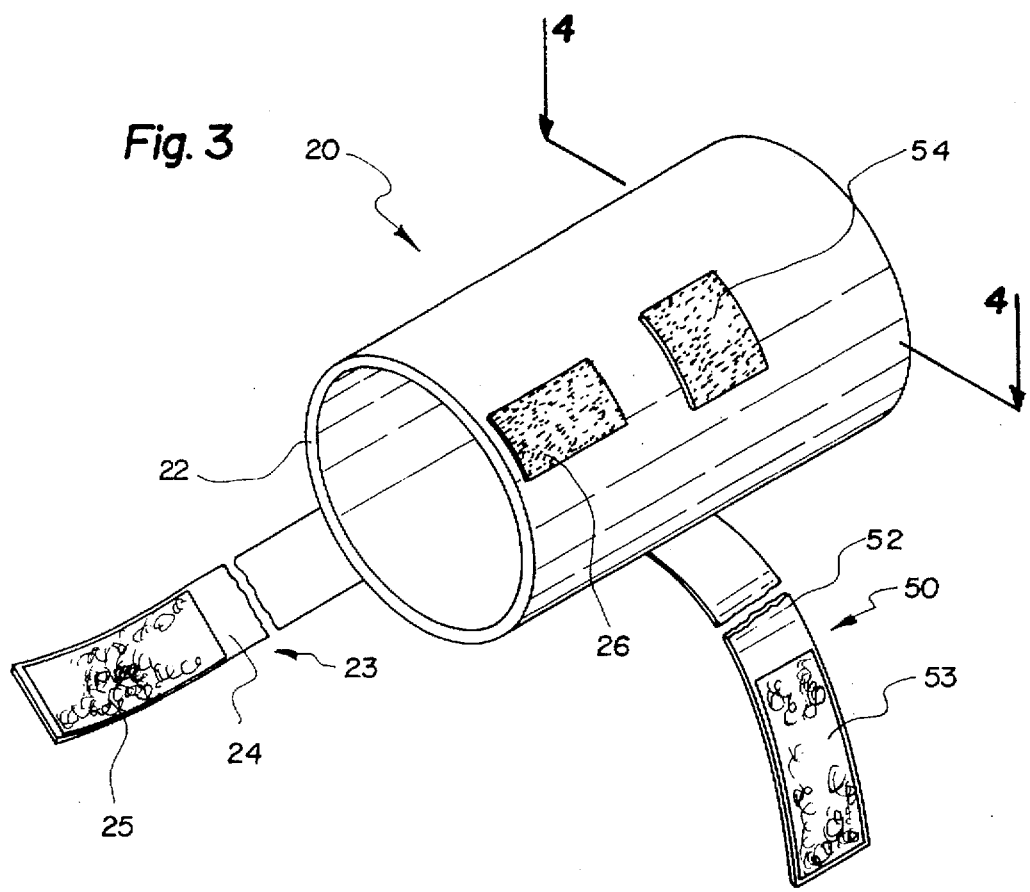
FIG. 3 is an isometric illustration of the battery receptacle and the attachment means according to the present invention.
Figure 4:
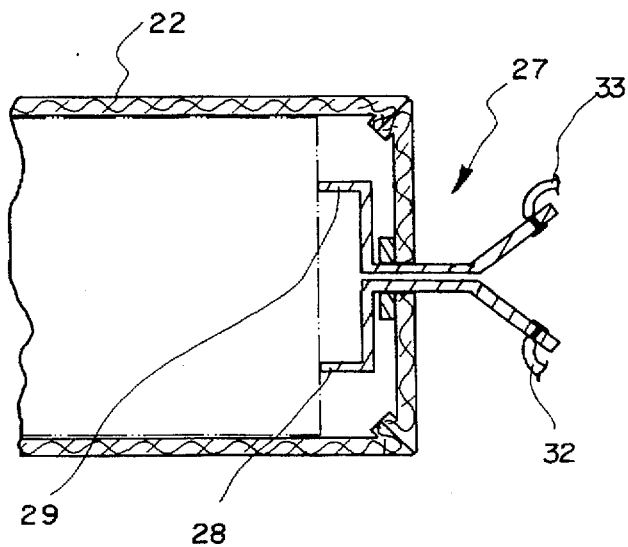
FIG. 4 is a cross sectional view of the battery receptacle taken along line 4—4 of FIG. 3 showing the battery receptacle terminal according to the present invention.

As best illustrated in FIGS. 2 and 4, it can be shown that the battery receptacle terminal 27 has a positive battery contact 28 and a negative battery contact 29. The battery holder 21 securely retains the rechargeable battery 2 in contact with the positive battery contact 28 and the negative battery contact 29 of the battery receptacle terminal 27. As best illustrated in FIGS. 2 and 3, it can be shown that the battery holder 21 comprises a battery sleeve 22 and a battery retention means 23 for removably retaining the rechargeable battery 2 in the battery sleeve 22. As best illustrated in FIGS. 1 through 3, it can be shown that the battery retention means 23 comprises a battery securement strap 24 having a hook end 25 and a loop end 26.

Figure 5:
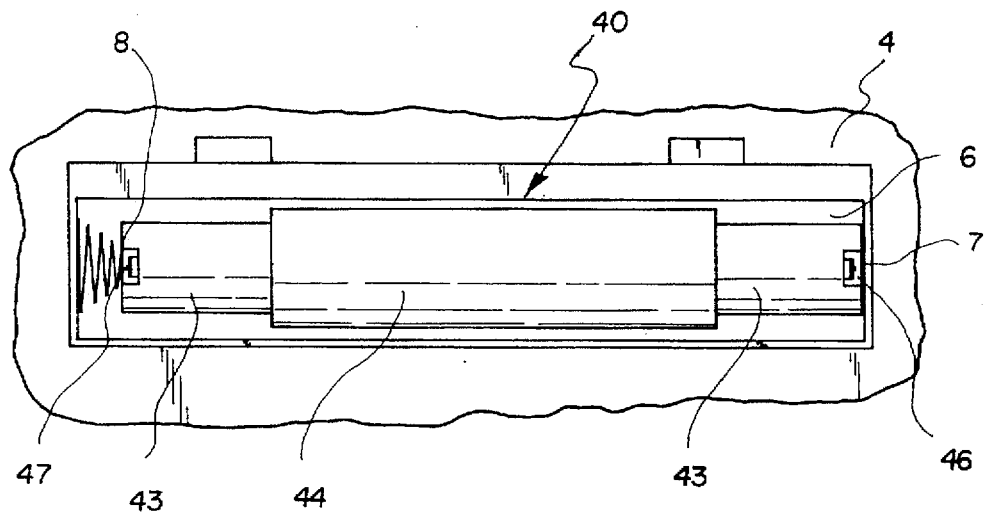
FIG. 5 is an illustration of the battery compartment connector positioned in the battery compartment of an electrical device according to the present invention.
Figure 6:
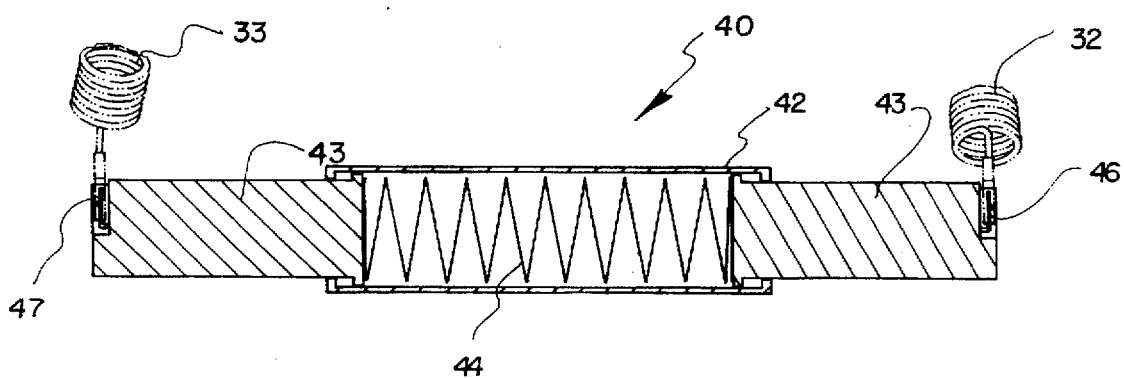
FIG. 6 is a cross sectional view of the battery compartment connector according to the present invention.

As best illustrated in FIGS. 5 and 6, it can be shown that the battery compartment connector 40 has a positive battery compartment contact 46 and a negative battery compartment contact 47 for respective contact with the positive battery terminal 7 and the negative battery terminal 8 in the battery compartment 6 of the electrical device 4. The battery compartment connector 40 comprises a sleeve member 42, a telescoping member 43 adjustably expandably coupled with the sleeve member 42, and a spring 44 retained within the sleeve member 42 which contacts one end of the telescoping member 43 and adjustably expands the telescoping member 43 such that the battery compartment contacts 46 and 47 contact the battery terminals 7 and 8 in the battery compartment 6 of the electrical device 4. The battery compartment connector 40 may be of varying sizes to accommodate the corresponding varying size of the battery compartment 6 depending upon the battery size required by the electrical device 4 (i.e., AA, C, D, etc.). The battery compartment connector 40 may, of course, be modified for use in a battery compartment 6 which accommodates non-cylindrical batteries. For example, the battery compartment connector 40 can be used to replace a 9 volt battery, such as that used in radios and similar electronic devices, and can be used to replace a battery used in electric torches and the like.

As best illustrated in FIGS. 2 and 6, it can be shown that the transmission wire 30 comprises a positive lead wire 32 and a negative lead wire 33. The positive lead wire 32 and the negative lead wire 33 are respectively connected at one end to the positive battery contact 28 and the negative battery contact 29 of the battery receptacle terminal 27 and connected at another end to the positive battery compartment contact 46 and the negative battery compartment contact 47 of the battery compartment connector 40. Connection between the lead wires 32 and 33 and the battery compartment contacts 46 and 47 is made by a female connector 39 at the end of the lead wires 32 and 33 and a male connector 49 at the battery compartment contacts 46 and 47.

As best illustrated in FIGS. 1 and 3, it can be shown that the Portable Rechargeable Battery Adaptor Assembly 10 further comprises an attachment means 50 for removably securing the battery receptacle 20 to a support member 5 of the electrical device 4. As best illustrated in FIGS. 1 through 3, it can be shown that the attachment means 50 comprises a securement strap 52 having a hook end 53 and a loop end 54.

In use, a rechargeable battery 2 is placed in the battery sleeve 22 of the battery holder 21 such that the rechargeable battery 2 operably contacts the positive battery contact 28 and the negative battery contact 29 of the battery receptacle terminal 27. The battery securement strap 24 having a hook end 25 and a loop end 26 removably secures the rechargeable battery 2 in the battery sleeve 22 wherein the securement strap 24 couples the rechargeable battery 2 and the hook end 25 securely mates with the loop end 26. The female connector 39 of the positive lead wire 32 is connected with the male connector 49 of the positive battery compartment contact 46 of the battery compartment connector 40 and the female connector 39 of the negative lead wire 33 is connected with the male connector 49 of the negative battery compartment contact 47 of the battery compartment connector 40. The telescoping member 43 of the battery compartment connector 40 is adjustably expanded such that the positive battery compartment contact 46 contacts the positive battery terminal 7 and the negative battery compartment contact 47 contacts the negative battery terminal 8 in the battery compartment 6 of the electrical device 4. The securement strap 52 removably secures the battery receptacle 20 to a support member 5 of the electrical device 4.

Similarly, the present invention can be used to adapt a standard rechargeable battery for use in an electronic device that itself receives a rechargeable battery. Such electronic devices include video cameras, portable computers, and similar electronic items. The rechargeable batteries used in these electronic devices are normally of a non-standard proprietary shape. When the standard rechargeable battery is used to power such electronic devices, it is placed in the battery holder as hereinabove described, and a positive terminal of the standard rechargeable battery is electrically coupled to the positive terminal receiving station of the electronic device by a first transmission wire and the negative terminal of the standard rechargeable battery is electrically coupled to the negative terminal receiving station of the electronic device by a second transmission wire, thus completing the circuit. As such, a standard rechargeable battery can be used to replace an often costly, non-standard proprietary-shaped rechargeable battery that is normally used in such electronic devices.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A portable rechargeable battery adapter assembly for adapting a rechargeable battery for use in an electrical device having a battery compartment including a positive battery terminal and a negative battery terminal, said portable power adaptor comprising:

a battery receptacle comprising a battery holder and a battery receptacle terminal having a positive battery contact and a negative battery contact, said rechargeable battery securely retained in said battery holder and contacting said positive battery contact and said negative battery contact;

a battery compartment connector comprising a sleeve member, a telescoping member adjustably expandably coupled with said sleeve member, a spring retained within said sleeve member, said spring contacting one end of said telescoping member and adjustably expanding said telescoping member such that a positive battery compartment contact contacts said positive battery terminal of said battery compartment of said electrical device and a negative battery compartment contact contacts said negative battery terminal of said battery compartment of said electrical device; and a transmission wire comprising a positive lead wire and a negative lead wire, said positive lead wire connected at one end to said positive battery contact of said battery receptacle terminal and another end to said positive battery compartment contact of said battery compartment connector, and said negative lead wire connected at one end to said negative battery contact of said battery receptacle terminal and another end to said negative battery compartment contact of said battery compartment connector.

2. The Portable Rechargeable Battery Adapter Assembly of claim 1, wherein said battery holder comprises:

a battery sleeve; and a battery retention means for removably securing said rechargeable battery in said battery sleeve.

3. The Portable Rechargeable Battery Adapter Assembly of claim 2, wherein said battery retention means comprises a hook and loop securement strap.

4. The Portable Rechargeable Battery Adapter Assembly of claim 1, wherein said battery compartment connector is of a size corresponding to a battery size required by said electrical device.

5. The Portable Rechargeable Battery Adapter Assembly of claim 1, further comprising an attachment means for removably securing said battery receptacle to said electrical device.

6. The Portable Rechargeable Battery Adapter Assembly of claim 5, wherein said attachment means comprises a hook and loop securement strap.

7. The Portable Rechargeable Battery Adapter Assembly of claim 1, wherein said rechargeable battery is of the kind commonly used for cordless power tools.

8. A portable rechargeable battery adapter assembly for adapting a rechargeable battery for use in an electronic device having a battery compartment including a positive and a negative terminal receiving station, the adapter assembly comprising:

a battery holding means adapted for holding the rechargeable battery;

a holding means terminal attached to the battery holding means, the holding means terminal having a positive and a negative holding means terminal contact, the positive holding means terminal contact adapted to form an electrically conductive joint with a positive terminal of the rechargeable battery, the negative holding means terminal contact adapted to form an electrically conductive joint with a negative terminal of the rechargeable battery;

a positive lead wire engaged to the positive holding means terminal contact;

a negative lead wire engaged to the negative holding means terminal contact;

a battery compartment connection means, the connection means having a housing tube, the housing tube having a lip at a first and second tube end, one extension member extending outwardly from each respective tube end, a spring means within the tube positioned between the extension members such that an extension member flange is urged outwardly into contact with the respective tube lip, each extension member having an extension member contact positioned at a distal extension member end; and the positive and negative lead wires are engageable to a respective extension member contact such that the positive lead wire is positionable in electrically conductive contact with the positive terminal receiving station and the negative lead wire is positionable in electrically conductive contact with the positive terminal receiving station.

9. The portable rechargeable battery adapter assembly of claim 8, wherein said battery holding means comprises a hook and loop securing device.

10. The portable rechargeable battery adapter assembly of claim 8, wherein said battery compartment connection means is of a size corresponding to a battery size required by said electronic device.

11. The portable rechargeable battery adapter assembly of claim 8, wherein said battery holding means is adapted to hold a battery of a type normally used with power tools.

12. The portable rechargeable battery adapter assembly of claim 8 wherein the battery holding means is a flexible sleeve adapted to snugly hold the rechargeable battery.

13. The portable rechargeable battery adapter assembly of claim 8 wherein each extension member contact is constructed from an electrically conductive material and each extension member contact is in electrically conductive contact with and positioned between the respective lead wire and the respective terminal receiving station.

14. The portable rechargeable battery adapter assembly of claim 13, adapted for use with an electronic device of the type having multiple terminal receiving stations positioned proximate to each other, wherein each extension member contact is structured to contact multiple terminal receiving stations positioned proximate to each other.

* * * * *